United States Patent [19]

Hens et al.

[11] Patent Number: 5,332,537
[45] Date of Patent: Jul. 26, 1994

[54] METHOD AND BINDER FOR USE IN POWDER MOLDING

[75] Inventors: Karl F. Hens; Donald M. Kupp, both of St. College, Pa.; Ricky A. Alexander, Highland Heights; Karl-Heinz Schofalvi, Cleveland, both of Ohio

[73] Assignee: PCC Airfoils, Inc., Cleveland, Ohio

[21] Appl. No.: 991,990

[22] Filed: Dec. 17, 1992

[51] Int. Cl.$^5$ .............................................. C04B 38/04
[52] U.S. Cl. .......................... 264/22; 264/25; 264/63; 264/344; 419/36; 419/37
[58] Field of Search .................... 264/63, 344, 22, 25; 419/36, 37

[56] References Cited

U.S. PATENT DOCUMENTS

| | | |
|---|---|---|
| 2,694,245 | 11/1954 | Rogers et al. . |
| 2,817,886 | 12/1957 | Tobler et al. . |
| 2,939,199 | 6/1960 | Strivens ................... 264/63 |
| 3,266,893 | 8/1966 | Duddy . |
| 4,196,011 | 4/1980 | Koike . |
| 4,197,118 | 4/1980 | Wiech .................... 264/63 |
| 4,283,360 | 8/1981 | Henmi .................... 264/63 |
| 4,554,218 | 11/1985 | Gardner et al. . |
| 4,661,315 | 4/1987 | Wiech, Jr. . |
| 4,765,950 | 8/1988 | Johnson .................. 264/63 |
| 4,783,297 | 11/1988 | Ito et al. .................. 264/67 |
| 4,948,426 | 8/1990 | Kato et al. . |
| 4,968,460 | 11/1990 | Thompson ............... 264/63 |
| 4,983,354 | 1/1991 | Reeder et al. . |
| 5,014,763 | 5/1991 | Frank . |
| 5,043,014 | 8/1991 | Flochel . |
| 5,047,182 | 9/1991 | Sundback et al. . |
| 5,059,388 | 10/1991 | Kihara et al. ............ 264/63 |
| 5,080,846 | 1/1992 | Kim et al. . |

FOREIGN PATENT DOCUMENTS

61-10050  1/1986  Japan ........................... 264/63

OTHER PUBLICATIONS

Cowan, Epoxy Resins as Temporary Binders for Ceramics Ceramic Bulletin, vol. 45, May 1966, pp. 535–538.

Congress Guide 1992 Powder Metallurgy; Powder Injection Molding Symposium Abstracts; A New Solid Polymer Solution Binder for Powder Injection Molding; M. Y. Cao, C. I. Chung, J. W. O'Connor Rensselaer Polytechnical Institute.

A New Water Soluble Solid Polymer Solution Binder For Powder Injection Molding, M. Y. Cao, J. W. O'Connor and C. I. Chung Material Engineering Department; Rensselaer Polytechnic Institute Troy, N.Y. Publication date unknown.

*Primary Examiner*—James Derrington
*Attorney, Agent, or Firm*—Tarolli, Sundheim & Covell

[57] ABSTRACT

An improved binder is mixed with powder to form feedstock for molding. The binder includes a first component which is soluble in water and a second component which is insoluble in water. The two binder components are miscible with each other in a liquid state. The two binder components form a uniform heterogeneous mixture when mixed in a liquid state. The binder is mixed with a suitable powder to form the feedstock. The feedstock is molded to form a compact. Polymer units of the binder are cross linked after the compact has been formed. The cross linking of the polymer units of a component of the binder is accomplished by exposing the compact to ultraviolet radiation or by the use of a catalyst. The compact is partially debound by exposing the compact to water, that is, to a water based solvent. Thereafter, the compact is further debound to remove the component which is insoluble in water. The powder is then sintered to form an article.

9 Claims, 2 Drawing Sheets

METHOD AND BINDER FOR USE IN POWDER MOLDING

BACKGROUND OF THE INVENTION

The present invention relates to a method and binder for use in the fabrication of metal, ceramic, or intermetallic articles from powder particles.

A binder is commonly mixed with powder to form a feedstock for injection molding. The binder functions as a vehicle which holds the powder in a desired shape until the powder is sintered. Known binders are disclosed in U.S. Pat. Nos. 5,080,846 and 5,043,014. Other known binders are disclosed in U.S. Pat. Nos. 5,047,182; 5,014,763; 4,765,950; 4,661,315; and 2,694,245.

Known binders have been used in conjunction with metal, ceramic, and/or intermetallic powder particles to form cores for casting of molten metals, automotive engine parts, roller bearings, refractories for molten metal industries and chemically resistant parts for chemical industries. In addition, binders have been used with suitable powders to form components for computer disk drive parts, biomedical instruments, and biomedical protheses. It should be understood that binders have been used with suitable powders for forming of many different types of articles and that the present invention is not to be considered as being limited to the use of a binder with any one particular type of powder for the forming of any one particular type of article.

SUMMARY OF THE INVENTION

The present invention provides a new and improved binder which is formed and/or used in accordance with a new and improved method. During forming of the binder, a uniform heterogeneous mixture of binder components is formed. The binder components are miscible with each other in a liquid state. The uniform heterogeneous mixture of liquid binder components includes a first binder component which is soluble in water and a second binder component which is insoluble in water. The binder components are mixed with a suitable powder, such as metal, ceramic, or intermetallic powder.

The mixture of powder and binder is molded to form a compact. The compact is partially debound to at least partially remove the water soluble component of the binder from the compact. This is accomplished by exposing the compact to water. Thereafter, the compact is further debound to at least partially remove the water insoluble component of the binder. The powder in the compact is then sintered to form an article.

In accordance with another feature of the invention, polymer units of a component of the binder are cross linked after the compact has been formed and prior to sintering of the powder. Cross linking of polymer units of a component of the binder strengthens the compact. The cross linking of polymer units of a component of the binder may be performed either before or after partial debinding of the compact. The polymer units which are cross linked may be part of the water insoluble component of the binder.

The cross linked polymer units of the binder may form a layer around the periphery of the compact. Although the cross linking of the polymer units could be performed in many different ways, it may be performed by exposing the compact to ultraviolet radiation.

It is believed that it may be advantageous to shape the compact prior to sintering. Thus, a tool may be used to remove a portion of the compact. The removal of a portion of the compact may be done either before or after partial debinding of the compact. However, it may be preferred to remove a portion of the compact after cross linking of polymer units of the binder.

BRIEF DESCRIPTION OF THE DRAWINGS

The foregoing and other features of the invention will become apparent upon a consideration of the following description taken in connection with the accompanying drawings wherein.

DESCRIPTION OF PREFERRED EMBODIMENT

Figure 1:
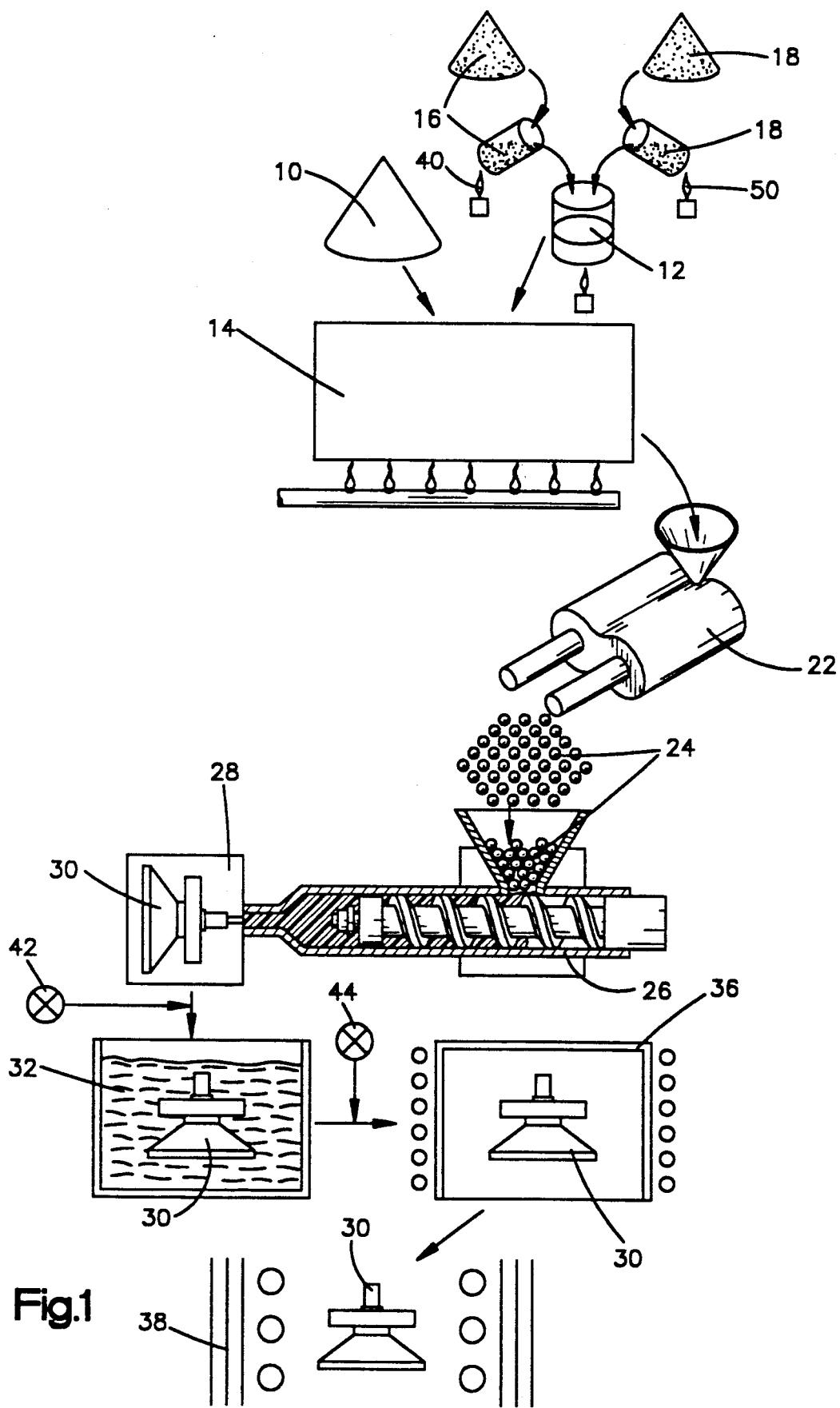
FIG. 1 is a schematic illustration of the manner in which binder and powder are mixed and used to form a compact which is subsequently debound and sintered.

Particulates, that is powder particles 10 (FIG. 1) are mixed with an improved binder 12 for injection molding. The powder particles 10 may be ceramic, metal and/or intermetallic. The particular powder utilized will depend upon the desired characteristics of the final product.

The powder 10 contains suitable dispersants, lubricants and/or surfactants which are used to coat the powder particles in a known manner. The improved binder or carrier 12 is mixed, in a mixer 14, with the powder 10. The improved binder 12 includes a water soluble component 16 and a water insoluble component 18.

In accordance with one of the features of the present invention, the water soluble and water insoluble components 16 and 18 of the binder 12 are completely miscible in each other when they are in a liquid state. Since the components of the binder 12 are completely miscible in each other in a liquid state, very little energy is utilized to intermix the binder components 16 and 18 and form a uniform heterogeneous liquid mixture. Thus, the liquid binder components 16 and 18 can be mixed to form a uniform heterogeneous mixture with less than one hour of mixing. Specific liquid binder components 16 and 18 have been mixed for less than ten minutes to form a uniform heterogeneous mixture.

The water soluble component 16 of the binder includes at least one hydrophylic functional group and has a molecular weight which is under 10,000. The water insoluble component 18 of the binder is a polymer having hydroxyl groups copolymerized with non-polar diluents to such an extent as to be insoluble with a water based media. Thus, the hydroxyl groups are copolymerized with non-polar diluents which are incapable of hydrogen bonding. The water soluble component 16 and water insoluble component 18 may initially be powders which are heated to change them from their solid states to their liquid states.

The water soluble and water insoluble components 16 and 18 of the binder 12 are completely miscible in each other when in a liquid state. Therefore, the binder components 16 and 18 are easily intermixed to form a uniform, two phase, heterogeneous liquid mixture 12, that is, a uniform liquid mixture having particles of dissimilar characteristics. One of the two phases of the uniform heterogeneous mixture 12 is formed by the water soluble component 16 of the binder. The other phase is formed by the water insoluble component 18 of the binder 12.

The liquid heterogeneous mixture 12 of water soluble and water insoluble components 16 and 18 is mixed with the powder 10, which has been coated with dispersant, lubricant, and/or surfactant, to form a substantially uniform feedstock. The mixing of the binder 12 with the powder 10 occurs at elevated temperatures in the sigma blade mixer 14. Therefore, during mixing with the powder 10, the binder 12 has a relatively low viscosity. The mixture of binder 12 and powder 10 is pelletized by a pelletizer 22 to form a feedstock 24.

The feedstock 24 is injection molded by a machine 26, into dies 28. The feedstock 24 is molded to a configuration which is a function of the configuration of an article to be formed. Many different types of powder 10 can be mixed with the binder 12 to form feedstock 24 which is molded into a die or mold 28 to form a compact 30 having any desired configuration.

The feedstock 24 is injection molded at elevated temperatures so that the binder 12 has a relatively low viscosity. At the elevated temperatures, the binder 12 allows the feedstock 24 to flow and pack into a die cavity. However, the viscosity of the feedstock 24 at the elevated temperatures is not so low that the binder and powder will separate during the injection molding. Although it is preferred to injection mold the feedstock 24 to form the compact 30, the feedstock could be molded by extruding, transfer molding, pressing or other known molding techniques.

The viscous feedstock 24 cools and solidifies in the mold 28 to form the compact 30. The water soluble and water insoluble components 16 and 18 of the binder 12 hold the powder particles 10 in the compact 30 together upon cooling of the compact. Thus, upon cooling of the compact 30, there is a substantial increase in the viscosity of the binder 12 to hold the shape of the compact.

Figure 2:
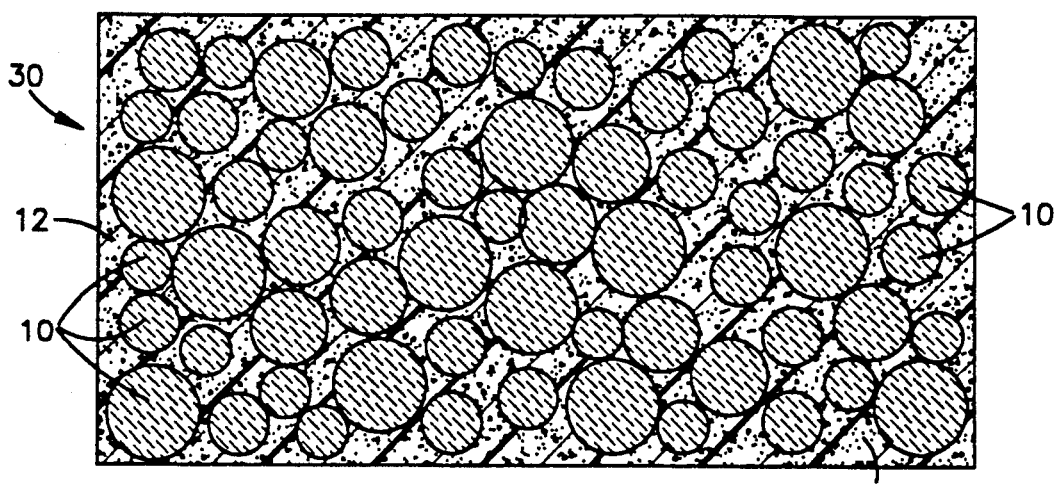
FIG. 2 is a greatly enlarged and schematized illustration of a portion of a compact after molding.

The manner in which the binder 12 holds particles of the powder 10 together is illustrated schematically in FIG. 2. At this time, the solidified binder 12 interconnects the powder particles 10 so that the compact 30 has substantial green strength.

It is preferred to remove the binder 12 from the compact 30 before sintering the compact. Thus, there is a partial debinding of the compact 30 by removal of at least a portion of the water soluble component 16 of the binder 12. In accordance with another feature of the invention, this is accomplished by exposing the compact 30 to a water based solvent 32 (FIG. 1) which removes at least 80% of the water soluble component 16 of the binder 12. Of course, a smaller percentage of the water soluble component 16 could be removed if desired.

The compact 30 may be exposed to the water based media or solvent 32 by immersing the compact in a body of water. The body of water may be deionized and/or may contain additions to control the leaching rate and/or to control the effects of water on the powder particles and/or binder. The water 32 may be deoxidized or contain corrosion inhibitors when powder particles with high corrosion potential are used. The water 32 may be agitated to accelerate removal of the water soluble component 16 of the binder 12, the water insoluble component 18 of the binder provides strength to hold the powder particles 10 together. The use of a water based solvent to remove the water soluble component 16 of the binder 12 minimizes environmental concerns.

Removal of all or at least a substantial portion of the water soluble component 16 of the binder 12 opens pores or passages in the compact 30 to allow gas to escape from the compact during removal of the water insoluble component 18 of the binder 12 and/or sintering of the powder 10. Of course, the generation of gas pressure within the compact 30 could result in the formation of defects in the compact. By removing the water soluble component 16 of the binder 12, more rapid debinding of the water insoluble component 16 of the binder can be achieved.

When sufficient debinding of the compact 30 has been accomplished to remove a desired amount of the water soluble component 16 of the binder 12, the compact is withdrawn from the body 32 of water. The compact 30 is then slowly dried in a moisture rich atmosphere. Slow drying of the compact 30 in a humid atmosphere ensures that the compact dries slowly throughout. If the compact 30 is dried too quickly at too high a temperature, the surface portion of the compact may crack.

Figure 3:
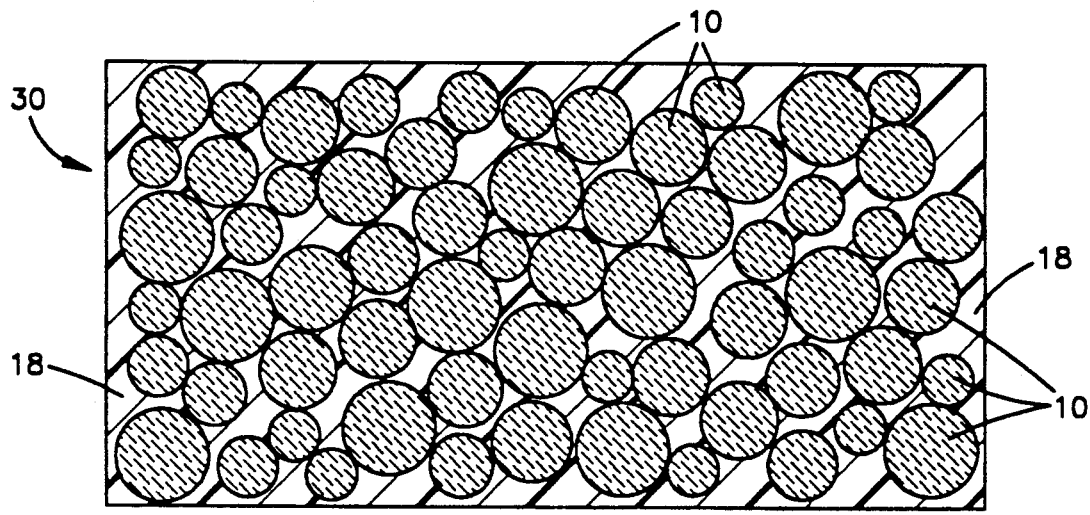
FIG. 3 is a enlarged schematic illustration of the compact after partial debinding by removing a water soluble component of the binder.

When the water soluble component 16 of the binder 12 has been removed from the compact 30, the powder particles 10 are interconnected by the water insoluble component 18 of the binder (FIG. 3). However, removal of the water soluble component 16 of the binder 12 from the compact 30 forms small passages through which gas can escape from the compact. Since the binder 12 was a uniform heterogeneous mixture, a uniform network of passages is formed in the compact 30 by removal of the water soluble component 16 of the binder 12.

After the water soluble component 16 of the binder 12 has been at least partially removed from the compact 30 and the compact has been slowly dried, the water insoluble 18 of the binder and any remaining portion of the water soluble component 16 are removed. This is accomplished by exposing the compact 30 to heat in a suitable oven or furnace 36 (FIG. 1). Heating the compact 30 vaporizes the water insoluble component 18 of the binder. The resulting gases escape from the compact 30 through pores formed by the removal of the water soluble component 16 of the binder 12.

Figure 4:
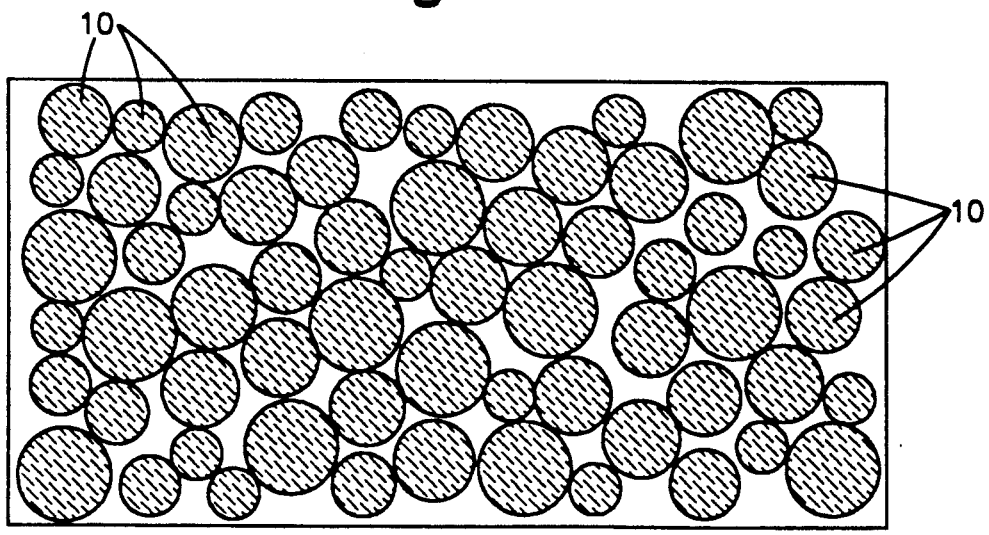
FIG. 4 is an enlarged schematic illustration, similar to FIGS. 2 and 3, illustrating in a compact after debinding by removal of water soluble and water insoluble components of the binder.

After removal of water soluble and water insoluble components 16 and 18 of the binder 12 (FIG. 4), the powder particles 10 are mechanically held together. The compact 30 is then sintered in a suitable furnace 38 (FIG. 1) to bond the powder particles together. Thus, the sintered powder particles 10 are interconnected by cohesive necks and/or weld bonds between the powder particles. The powder particles 10 may all have the same composition or two or more different compositions depending upon the characteristics of the article to be formed.

The heating of the compact 30 to remove the water insoluble component 18 of the binder 12 and subsequent sintering of the compact 30 occurs in a suitable atmosphere. Thus, heating could occur in an atmosphere containing air, argon, carbon dioxide, carbon monoxide, hydrogen, and/or other gases. Although it is not necessary, it may be preferred to conduct the final debinding of the compact 30 as the initial portion of a combined debinding and sintering process. Thus, after the compact 30 has been heated to a temperature sufficient to effect removal of the water insoluble component 18 of the binder 12, the heating of the compact can be continued to effect sintering of the compact. However, for furnace process and/or atmosphere control reasons, it may well be desired to remove the binder component 18 and sinter the powder particles 10 in two separate furnaces 36 and 38.

During sintering of the compact 30, bonding together of particles of the powder 10 occurs. The temperature at which sintering is conducted and the length of time for which the compact 30 is maintained at the sintering temperature will depend upon the characteristics of the powder 10, the dimensions of the product, and the desired characteristics of the product. It should be understood that the improved binder of the present invention may be used with many different type of powders which are subjected to many different types of sintering processes. In fact, the binder may be used with powders which do not require sintering.

In accordance with another feature of the invention, polymer units of a component of the binder 12 are cross linked to increase the strength of the compact 30 before sintering. Cross linking of the polymer units of a component of the binder 12 results in attachment of chains of polymer molecules by bridges which form certain carbon atoms of the chains by primary chemical bonds. Cross linking of the polymer units of the binder 12 may be accomplished in many different ways. Thus, the compact 30 may contain a catalyst to promote cross linking of the polymer units upon exposure to heat or radiation. The catalyst could be in powder form and mixed with the powder 10 before adding the binder 12. However, a liquid catalyst could be added directly to the binder 12.

The cross linking of the polymer units of a component of the binder 12 occurs at and immediately adjacent to the surface of the compact 30. Cross linking of the polymer units of a component of the binder at and immediately adjacent to the surface of the compact 30 may be accomplished by spraying the compact with a liquid or gaseous catalyst or dipping the compact into a liquid catalyst. If this is done, it is not necessary to provide a catalyst in either the powder 10 or binder 12.

When the cross linking of polymer units of the compact 30 is to be accomplished by a thermosetting reaction, the compact is slowly heated to a temperature which is sufficient to cause a thermosetting cross linking reaction to occur. This temperature is not so high as to result in removal of the water soluble and/or the water insoluble components 16 and 18 of the binder 12.

If the cross linking of polymer units of a component of the binder 12 occurs before partial debinding of the compact by removal of the water soluble component 16 of the binder, a thermosetting reaction may be conducted at a temperature which will not effect removal of either the water soluble or water insoluble components 16 or 18 of the binder 12. When the cross linking of the polymer units of a component of the binder 12 is to occur before partial debinding of the compact 30, the cross linking occurs in the manner indicated schematically at 42 in FIG. 1.

Similarly, if the cross linking of polymeric units of a component of the binder 12 occurs after partial debinding of the compact by removal of the water soluble component 16 of the binder, the thermosetting reaction is conducted at a temperature which will not effect removal of the water insoluble component 18 of the binder. When cross linking of the polymer units of a component of the binder 12 is to occur after partial debinding of the compact 30, the cross linking occurs in the manner indicated schematically at 44 in FIG. 1. It is contemplated that cross linking of the polymer units of a component of the binder 12 could occur both before and after partial debinding of the compact 30, in the manner indicated schematically at 42 and 44 in FIG. 1.

Although the cross linking of polymer units of a component of the binder 12 could occur either before and/or after removal of the water soluble component 16 of the binder, it is believed that it may be preferred to effect the cross linking of the polymer units before partially debinding the compact by removing the water soluble component 16 of the binder. This is because the strength of the binder 12 is reduced by the removal of the water soluble component 16 of the binder. By cross linking the polymer units of a component of the binder 12 before partially debinding the compact by removal of the water soluble component 16 of the binder, in the manner illustrated schematically at 42 in FIG. 1, the strength of the partially debound compact 30 is enhanced. However, it is contemplated that the cross linking of polymer units of a component of the binder 12 could occur either before or after partial debinding of the compact by removing of the water soluble component 16 of the binder.

In accordance with another of the features of the invention, the cross linking of polymer units of a component of the binder 12 may be effected by exposing the compact 30 to ultraviolet radiation. Exposure of the compact 30 to ultraviolet radiation, at relatively low temperatures, initiates the cross linking reaction due to the energy transmitted through the relatively short wave length ultraviolet radiation. The ultraviolet radiation accelerates the cross linking reaction between the polymer units of a component of the binder 12 and enables the reaction to occur at relatively low temperatures. Cross linking of the polymer units of a component of the binder 12 may be effected by ultraviolet radiation in combination with other methods of effecting cross linking.

By exposing the compact 30 to ultraviolet radiation before partially debinding the compact to remove the water soluble component 16 of the binder, as indicated at 42 in FIG. 1, the cross linking of the polymer units of a component of the binder 12 strengthens the compact 30. This eliminates or at least minimizes any tendency for the compact 30 to sag or otherwise deform during removal of the water soluble component 16 of the binder. Since exposure of the compact 30 to ultraviolet radiation causes the cross linking reaction to occur at relatively low temperatures, there is a minimal tendency for the compact 30 to deform during the cross linking reaction. If desired, the cross linking reaction could be initiated, by exposure to ultraviolet radiation, after removing the water soluble component 16 of the binder, in the manner indicated at 44 in FIG. 1.

It is preferred to cross link polymer units of the water insoluble component 18 of the binder 12. Thus, the water insoluble component 18 of the binder 12 contains chains of polymer molecules which are attached by bridges which join certain carbon atoms with primary chemical bonds. The cross linking can be effected by addition of a chemical substance (catalyst) and exposing the binder 12 to heat, by exposing the compact 30 to ultraviolet radiation and/or by other methods.

If the compact 30 is formed with portions which are not desired in the final product, these undesired portions of the compact are advantageously removed before sintering of the compact. Thus, a tool may be used to remove portions of the compact 30. This may be done either before or after partially debinding the compact 30 and either before or after cross linking of polymer units of the water insoluble component 18 of the compact. Removing portions of the compact 30 before sintering of the compact is relatively easy and has a minimal tendency to dull a tool.

The compact is the weakest, and therefore, the most easily cut away after the water soluble component 16 of the binder 12 has been removed and prior to cross linking of polymer units of the water insoluble component 18 of the binder. However, handling of the compact 30 at this time may result in undesired deformation of the compact. Therefore, it is contemplated that it may be desired to remove a portion of the compact 30 either before or after partially debinding the compact by removal of the water soluble component 16 of the compact.

The strength of the compact is enhanced if cross linking of the polymer units of the water insoluble component 18 of the compact 30 occurs prior to the partial debinding of the compact by removal of the water soluble component of the binder. Therefore, from the standpoint of minimizing the possibility of deformation of the compact 30 during removal of material, cutting away of a portion of the compact should occur after cross linking of polymer units of the binder and prior to removal of any portion of the binder 12. Of course, this will result in the compact 30 having a maximum amount of resistance to removal of a portion of the compact. Therefore, it may be preferred to remove a portion of the compact 30 after partially debinding the compact by removal of the water soluble component 16 of the binder and after cross linking the polymer units of the water insoluble component 18 of the binder.

Among other articles, it is contemplated that the present invention will be used in the forming of ceramic cores for molds. In one specific example, when a mold core was to be formed, the powder 10 was 80% spray dried alumina powder (280 grit) and 20% tabular alumina. The alumina powder was mixed with 5% fish oil as a dispersant and lubricant. The fish oil lubricant is preferably used with fine alumina powder particles and may be eliminated with coarse alumina powder particles. The precursor to the spray dried alumina powder (280 grit) was Alcoa A-16 tabular alumina. The 20% tabular alumina was Alcoa A-17.

The binder 12, in this specific embodiment, was 65% by volume of the water soluble component 16 and 35% by volume of the water insoluble component 18. The water soluble component 16 was polyethylene glycol having an average molecular weight of 3,350. The water insoluble component was polyvinyl butyral resin. Specifically, Monsanto B-98 polyvinyl butyral resin formed 30% by volume of the binder 12 and Monsanto B-72 polyvinyl butyral resin formed 5% by volume of the binder.

Other water soluble and water insoluble binder components 16 and 18 could be used if desired. For example the water soluble component 16 could be polyethylene oxide and/or the water insoluble component 18 could be an acetal resin such as "Celcon" (trademark).

The polyethylene glycol 16 and polyvinyl butyral resin 18 were both initially in a solid, powder (pellet) form. The polyethylene glycol and polyvinyl butyral resin were both heated, to approximately 200° C., in the manner indicated schematically at 40 and 50 in FIG. 1, to change them to their liquid states. The liquid polyethylene glycol 16 is completely miscible with the liquid polyvinyl butyral resin 18.

When the liquid polyethylene glycol 16 and the liquid polyvinyl butyral resin 18 are combined in a container, the fact that they are miscible allows them to quickly and easily form a uniform heterogeneous mixture with a minimum of stirring or agitation. Thus, the binder 12 formed a uniform heterogeneous mixture with less than 1 hour or agitation. In one specific case, the liquid polyethylene glycol and polyvinyl butyral resin were mixed at a temperature of approximately 200° C. to form a uniform heterogeneous mixture with less than 10 minutes of mixing. It is believed that less than 30 minutes of mixing will usually be required to form the uniform heterogeneous mixture of water soluble and water insoluble binder components 16 and 18.

The heated heterogeneous liquid mixture 12 of the polyvinyl butyral resin 18 and polyethylene glycol 16 was mixed with the alumina powder 10 which had been coated with fish oil. The mixing occurred in the sigma blade mixer 14 which is heated in the manner indicated schematically in FIG. 1. This resulted in the particles of alumina powder 10 being bound together by the binder 12 in which the polyvinyl butyral resin 18 is a water insoluble component and the polyethylene glycol 16 is a water soluble component.

The binder 12 and powder 10 where mixed at a temperature of about 200° C. At this elevated temperature, the powder/binder mixture is liquid with a viscosity of between 5 and 300 Pascal-seconds depending on the shear rate. As shear rate increases, the viscosity decreases.

The heated binder powder mixture was extruded at approximately 200° C. to form feedstock pellets 24. The feedstock pellets 24 were injection molded at a temperature of approximately 200° C. The resulting compact 30 was cooled and removed from the injection mold 28. As the compact 30 cooled and the binder 12 solidified, the binder held the powder particles against movement relative to each other.

The compact 30 was then exposed to ultraviolet radiation at a wave length of approximately 312 nanometers for a period of 30 minutes at a temperature of 20° C. to 30° C. However, the ultraviolet radiation could have a wavelength of 254 to 365 nanometers. The ultraviolet radiation caused a cross linking reaction to occur between polymer units of the polyvinyl butyral resin 18 in the binder 12. Exposure of the compact 30 to ultraviolet radiation caused cross linking of the polymer units of the polyvinyl butyral resin 18 to occur at or near the surface of the compact. Although cross linking of the polymer units of the polyvinyl butyral resin 18 is advantageously accomplished with ultraviolet radiation, other methods may be used. For example, cross linking could be accomplished using chemical catalysts, heat and/or radiant energy.

After the polymer units of the polyvinyl butyral resin 16 had been cross linked, a portion of the compact 30 was removed. This was accomplished by utilizing a blade to cut away a portion of the compact. The cross linked polymer units of the polyvinyl butyral resin 16 formed an exoskeleton which strengthened the compact 30 to minimize undesired deformation of the compact during the cutting away of a portion of the compact. The removal of a portion of the compact 30 could be accomplished with milling, grinding, drilling and/or other cutting operations if desired.

Partial debinding of the compact 30 was then effected by immersing the compact in a body 32 of water. The water soluble polyethylene glycol 16 was leached from the compact 30 by the water. After the compact 30 had been immersed in the body 32 of leaching solvent (deionized water) for approximately three hours at a temperature of 40° C. to 60° C., to remove the polyethylene glycol from the compact, the partially debound compact was removed from the water. The strength of the compact 30 was enhanced by the prior cross linking of polymer units of the polyvinyl butyral resin. It is contemplated that 5% by volume of polyethylene glycol having a molecular weight of 200 may be added to the body of water 32 to provide a more gentle removal action.

The wet compact 30 was slowly dried in a humid atmosphere. Thus, the wet compact 30 was dried in a humid environment which was maintained at a temperature of 60° C.

Thereafter, debinding of the compact 30 was completed by heating the compact to a temperature of approximately 600° C. and maintaining the compact at this temperature for a period of up to 2 hours. This heating of the compact 30 removed the remaining polyethylene glycol 16 and the polyvinyl butyral resin 18 from the compact. The compact 30 was then sintered by heating the compact to a temperature of approximately 1,650° C. for a period of up to 4 hours. The resulting product was a ceramic core suitable for use in a mold.

In view of the foregoing description, it is apparent that the present invention provides a new and improved binder which is formed and/or used in accordance with a new and improved method. During forming of the binder 12, a uniform heterogeneous mixture of binder components 16 and 18 is formed. The binder components 16 and 18 are miscible with each other in a liquid state. The uniform heterogeneous mixture 12 of liquid binder components includes a first binder component 16 which is soluble in water and a second binder component 18 which is insoluble in water. The binder components 16 and 18 are mixed with a suitable powder 10, such as metal, ceramic, or intermetallic powder.

The mixture of powder and binder is molded to form a compact 30. The compact 30 is partially debound to at least partially remove the water soluble component 16 of the binder 12 from the compact. This is accomplished by exposing the compact 30 to water. Thereafter, the compact 30 is further debound to at least partially remove the water insoluble component 18 of the binder. The powder 10 in the compact 30 is then sintered to form an article.

In accordance with another feature of the invention, polymer units of a component of the binder 12 are cross linked after the compact 30 has been formed and prior to sintering of the powder. Cross linking of polymer units of a component of the binder 12 strengthens the compact. The cross linking of polymer units of a component of the binder 12 may be performed either before or after partial debinding of the compact 30. The polymer units which are cross linked may be part of the water insoluble component of the binder.

The cross linked polymer units of the binder 12 may form a layer around the periphery of the compact 30. Although the cross linking of the polymer units could be performed in many different ways, it may be performed by exposing the compact 30 to ultraviolet radiation.

It is believed that it may be advantageous to shape the compact 30 prior to sintering. Thus, a tool may be used to remove a portion of the compact 30. The removal of a portion of the compact 30 may be done either before or after partial debinding of the compact. However, it may be preferred to remove a portion of the compact 30 after cross linking of polymer units of the binder 12.

Having described the invention, the following is claimed:

1. A method comprising the steps of forming a binder, said step of forming a binder including forming a uniform mixture by mixing a first binder component which is soluble in water and a second binder component which is insoluble in water, mixing the binder and a powder, molding the powder and binder mixture to form a compact, partially debinding the compact by at least partially removing the first component of the binder from the compact, said step of at least partially debinding the compact including exposing the compact to water, thereafter, further debinding the compact to at least partially remove the second component of the binder, sintering the powder in the compact to form an article, and cross linking polymer units of the insoluble binder component which is adjacent to the surface of the compact while leaving the polymer units of the insoluble binder component in the interior of the compact substantially free of polymer cross linking, said step of cross linking polymer units of the binder being performed after performance of said step of molding the powder and binder mixture and prior to performance of said step of sintering the powder.

2. A method as set forth in claim 1 wherein said step of cross linking polymer units of the binder is performed prior to performance of said step of partially debinding the compact by removing the first component of the binder.

3. A method as set forth in claim 1 wherein said step of cross linking polymer units of the binder is performed after performance of said step of partially debinding the compact by removing the first component of the binder.

4. A method as set forth in claim 1 wherein said step of forming a uniform mixture includes forming a heterogeneous mixture having at least two phases with one of the phases formed by the first binder component and another of the phases formed by the second binder component.

5. A method as set forth in claim 1 wherein said step of further debinding the compact to at least partially remove the second component of the binder includes exposing the compact to heat.

6. A method as set forth in claim 1 wherein said step of exposing the compact to water includes immersing the compact in a water based solvent for a time period long enough to remove at least 80% of the first component of the binder.

7. A method as set forth in claim 1 further including the step of removing a portion of the compact prior to performance of said step of exposing the compact to water.

8. A method as set forth in claim 1 wherein said step of cross linking polymer units of the binder includes exposing the compact to a catalyst.

9. A method as set forth in claim 1 wherein the step of cross linking polymer units of the binder includes exposing the compact to ultraviolet radiation.

* * * * *